J. F. STALLSMITH.
BALING PRESS.
APPLICATION FILED AUG. 19, 1912. RENEWED MAY 7, 1914.

1,113,064.

Patented Oct. 6, 1914.
6 SHEETS—SHEET 1.

Witnesses

J. F. Stallsmith, Inventor
by C. A. Snow & Co.
Attorneys

J. F. STALLSMITH.
BALING PRESS.
APPLICATION FILED AUG. 19, 1912. RENEWED MAY 7, 1914.

1,113,064.

Patented Oct. 6, 1914.
6 SHEETS—SHEET 2.

J. F. Stallsmith, Inventor

J. F. STALLSMITH.
BALING PRESS.
APPLICATION FILED AUG. 19, 1912. RENEWED MAY 7, 1914.

1,113,064.

Patented Oct. 6, 1914.
6 SHEETS—SHEET 4.

Witnesses

J. F. Stallsmith, Inventor
by C. A. Snow & Co.
Attorneys

J. F. STALLSMITH.
BALING PRESS.
APPLICATION FILED AUG. 19, 1912. RENEWED MAY 7, 1914.

1,113,064.

Patented Oct. 6, 1914.
6 SHEETS—SHEET 6.

Witnesses

J. F. Stallsmith, Inventor
by C. A. Snow & Co.
Attorneys

UNITED STATES PATENT OFFICE.

JOSEPH F. STALLSMITH, OF ROSEDALE, KANSAS.

BALING-PRESS.

1,113,064. Specification of Letters Patent. Patented Oct. 6, 1914.

Application filed August 19, 1912, Serial No. 715,932. Renewed May 7, 1914. Serial No. 837,074.

*To all whom it may concern:*

Be it known that I, JOSEPH F. STALLSMITH, a citizen of the United States, residing at Rosedale, in the county of Wyandotte and State of Kansas, have invented a new and useful Baling-Press, of which the following is a specification.

The present invention relates to improvements in baling presses, the primary object of the invention being the provision of a novel construction of power baling press adapted to be operated from an engine, preferably of the explosive type, the power mechanism thereof being provided with a peculiar construction of plunger operating means and self feed operating means.

A further object of the invention is the provision of a baling press provided with a novel form of self feed mechanism which is disposed to receive the hay or straw to be baled at right angles to the baling chamber, at one side of the press and convey the same into the baling chamber by means of a feeding device disposed to move from a position exteriorly of the machine and at right angles thereto to a position in line with the upper mouth of the baling chamber, an auxiliary means being provided to assist in the movement of the hay or straw to the baling chamber.

A still further object of the present invention is the provision of a novel form of hopper disposed to be used in conjunction with the self feeding mechanism whereby should the said hopper be crowded beyond the normal capacity thereof, the same will yield due to the crowding of the hay or straw therein and prevent any injury or breakage to the self feed mechanism.

A still further object of the invention is the novel form of actuating mechanism for the self feed device, whereby the said self feed device is halted for a period long enough during the compression stroke of the plunger to permit the proper filling of the hopper, the same being operated during the retraction of the plunger from compression position to the forward stroke thereof, to fill the baling chamber just quitted by the plunger.

A still further object of the present invention is the provision of a bale tying mechanism to be used in conjunction with the plunger and operable at the end of the plunger or compression stroke, said plunger being halted momentarily for the insertion of the baling wires so that the tying operation is in effect without the halting of the plunger or the stopping of the press.

A still further object of the invention is the provision of a plurality of retainer hooks adapted to engage the compressed bundle at the beginning of the retraction of the plunger to hold the bundle in compressed position and during the feeding of another charge of loose hay or straw into the baling chamber, the same being released upon the compression stroke of the plunger.

A still further object of the present invention is the provision of a power mechanism for operating the plunger the same being so constructed as to rapidly propel the plunger to and from the baling chamber, the movement of the plunger into the baling chamber and through the final compression stroke being reduced in speed but increased in power to secure the maximum compression of the bundle within the baling chamber.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In describing the baling press, the various mechanisms will be taken separately and headlined under the following subjects, to wit:—Power mechanism and baling plunger, self feed mechanism; bundle retaining mechanism; and bale tying mechanism.

*Power mechanism and baling plunger.*— Referring to the drawings, the numeral 1 designates the main frame of the complete baling press which is mounted for transportation upon the respective forward and rear wheels 2 and 3. Journaled within the upper forward portion of the frame is the main drive shaft 4 which has keyed upon one end thereof a sprocket or drive wheel 5, which is connected by means of any power transmision means, such as a sprocket chain 6 to an explosive engine (not shown), so that the said shaft 4 may be operated from and rotated simultaneously with such engine. Mounted upon the shaft 4 so as to be rotatable therewith, when desired, is a gear 7 which meshes at all times with the main large gear 8 of the power mechanism M, said power mechanism being disposed upon the upper forward portion of and within the frame 1 and mounted so as to be a rigid mechanism. The gear 8 is mounted upon a shaft 9 which is disposed transversely of the frame 1, while mounted upon the shaft 4 is the clutch 10 which is operated through the medium of the main lever 11 and the short levers 11' and 11'', to throw said clutch so that power will be transmitted from the shaft 4 through the gear 7 to the gear 8 as desired, the shaft 4 being a shaft that rotates continuously without affecting the gear 8 unless the clutch 10 is "in."

Figures 4, 5:
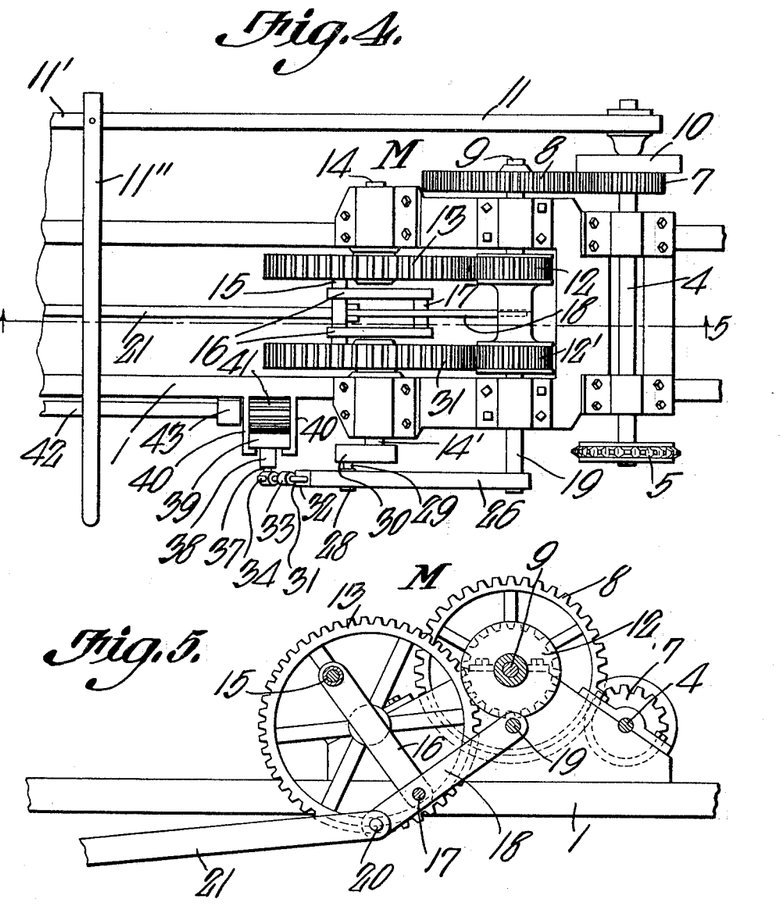
Fig. 4 is a top plan of the power mechanism for operating the baling plunger and self feed mechanism.
Fig. 5 is section taken on line 5—5 of Fig. 4.

Keyed upon and rotatable with the shaft 9 between the journals of the said shaft and within the frame 1 are the two gears or pinions 12 and 12', respectively, which are in mesh at all times with the two large gears 13 and 13', respectively which are mounted upon the respective shafts 14 and 14' journaled in the respective sides of the frame 1. These two gears 13 and 13' are connected together by means of the crank pin 15 so that when rotated by means of the shaft 9 and gears 12 and 12' respectively, said crank 15 will be rotated to impart the proper motion to the link or double arm 16, which is connected by means of the pin 17 to the operating lever 18, whose forward end is journaled upon the shaft 19, its lower free end being pivotally connected at 20 to the forward end of the plunger actuating link or rod 21, whose other end is operably connected to the baling plunger P. By this means the said baling plunger is given the proper movement into and out of the baling chamber C of the press, the movement of the plunger out of the baling chamber due to the connection of the arms 16 and lever 18 and the gears 13 and 13', being such that it is more rapid than the movement into the baling chamber or during the compression stroke, the plunger, however, being halted momentarily when the parts are in the position as shown in Fig. 5 and until the crank pin 15 reaches a point indicated in Fig. 8 prior to the retraction of the said plunger, the purpose of which will later appear.

Figures 9, 15, 16:
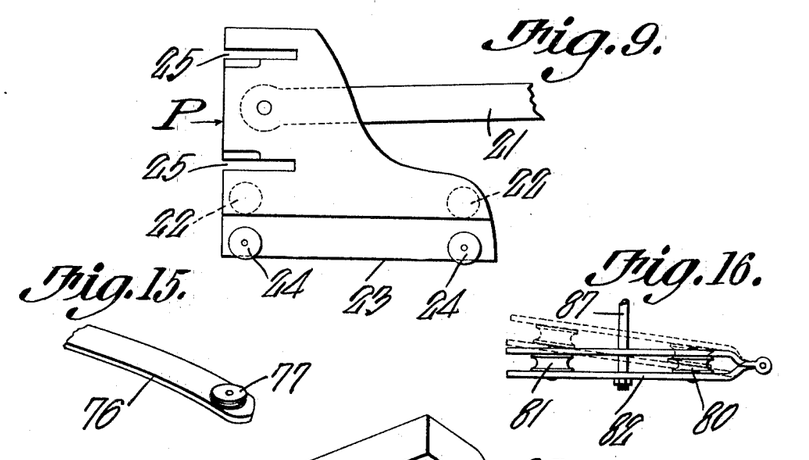
Figs. 9 and 10 are enlarged detail views of the plunger.
Figs. 15 and 16 are detail views of portions of the tying mechanism.
Figure 10:
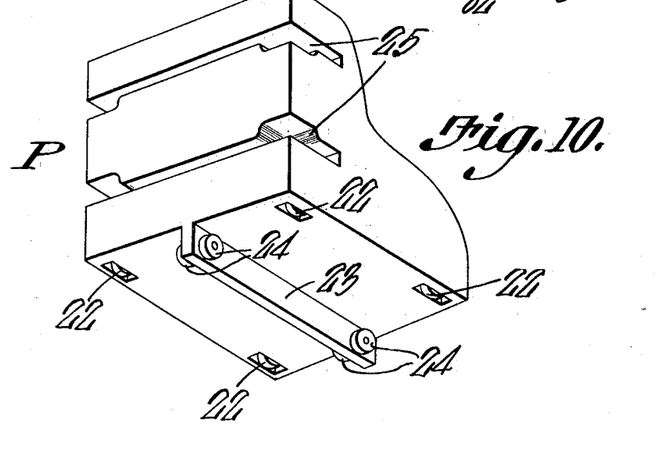

The plunger, as clearly shown in Figs. 9 and 10, is provided upon the lower face thereof with the four anti-frictional rollers 22 and with the longitudinal guide strip 23 which carries upon each side thereof at the respective ends the two anti-frictional rollers 24, this providing a means whereby the said plunger is properly guided in its reciprocatory movement within and out of the baling chamber during the compression and retraction stroke thereof, while formed in the forward face of the said plunger are the needle and wire receiving grooves 25, the detail construction and operation of which, will be set forth later under the bale tying mechanism.

Figure 14:
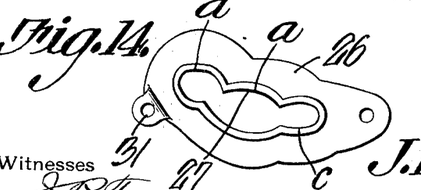
Fig. 14 is an enlarged side elevation of the self feed operating lever.

*Self feed mechanism.*—In order to provide a self feed mechanism which will permit the proper charging of a hopper without any detrimental effect to the feeding mechanism, the lever 26 is pivoted upon the extreme end of the shaft 19 exteriorly of the frame 1 and adjacent to the power mechanism M, and is provided with the peculiar shaped slot 27 therein which is clearly shown in detail in Fig. 14. This slot as shown is provided with the reduced portion having the straight walls $d$ and $c$ with the upper outwardly curving wall $a$ and with the reduced portion $d$, for the guidance or movement of the roller 28 which is carried by the short stub shaft 29 upon the crank 30, which is keyed upon the outer end of the short shaft 14' and is therefore rotatable with the gears 13 and 13' to impart the desired reciprocatory movement to the lever 26, during the passage of the cam or roller 28 within the slot 27 thereof. Thus the rotation of the shaft 14' will impart a movement to the said lever 26 so that the eyed lugs 31 thereof will be given a movement up and down and carry with it the pin 32 which connects the connecting link 33 to the outer end of the said lever 26. The lower end 34 of the said link is operably connected to the casting 35 of the arm or link 36, whose lower end is connected by means of the pin 37 to the stud or bar 38 of the reciprocatory rack 39, said rack 39 being disposed for vertical reciprocatory movement within the guide plates 40 mounted upon the frame 1. By this means it will be seen that the rack 39 has imparted thereto a vertical movement during the reciprocation of the lever 26, the peculiar shape of the slot 27 thereof imparting the various movements to the said rack 39 as will later appear.
Meshing at all times with the teeth of the rack 39 within the frame or guide 40 is a small pinion 41 keyed upon the forward end of the shaft 42, which is journaled in the bearings 43 and 44 upon the side of the frame 1 and the baling chamber C. Keyed upon and rotatable with the shaft 42 upon the opposite sides of the respective journals or bearings 44, are the small gears or pinions 45 which are in mesh at all times with the large gears 46 and 46' respectively, and as the shaft 42 has imparted several rotations in one direction and a similar number of rotations in the opposite direction due to the reciprocation of the rack 39, the gears 46 and 46', are oscillated a one-half rotation in each direction. These gears 46 and 46' carry pins 47 and 47' which connect the arms 48 of the self feeding mechanism to said gears 46 and 46', said arms 48 being provided upon their inner faces with the antifrictional rollers 49 which are disposed to engage the under side of the track or strips 58 while connected to the outer ends of the respective arms 48 are the standing flanges or plates 50 carrying the plate 51 which is disposed transversely of the outer free ends of the arms 48 and forms the packing or feeding means for moving the hay or straw from the position as shown in Fig. 6 to that shown in Fig. 7 into and through the open end C' of the baling chamber C. The outer end of the feeding plate 51 is provided with the extensible lip 55, whose flange 52 is connected by means of the pins 53 and springs 54 to the flange 51' of the plate 51, the purpose of which will presently appear.

Figures 6, 7:
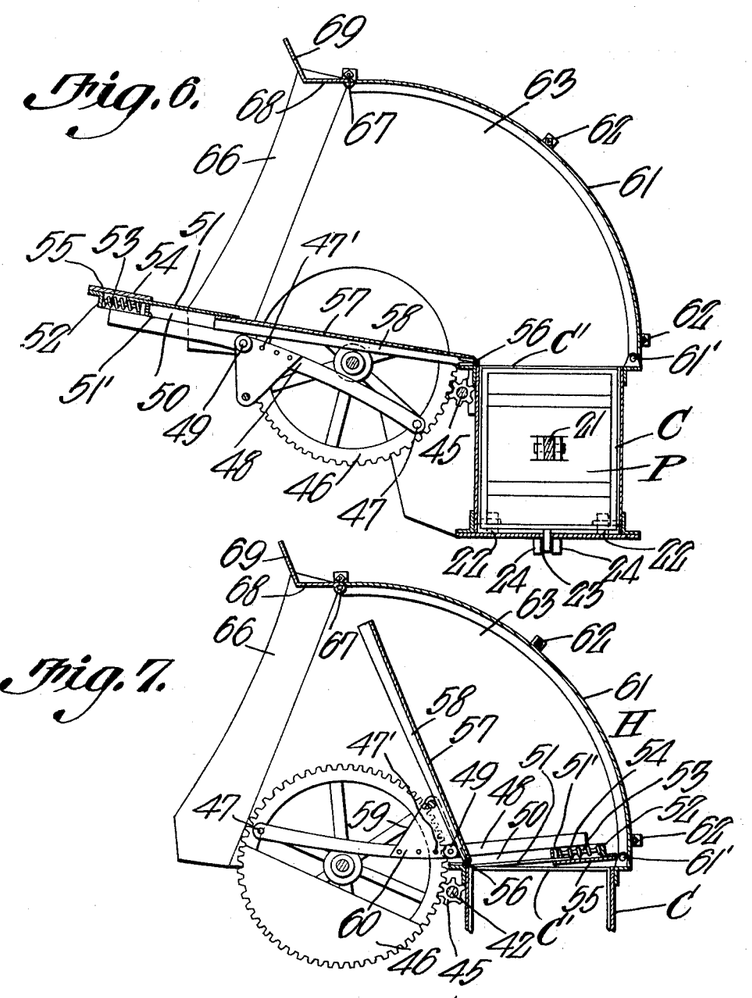
Fig. 6 is a section taken on line 6—6 of Fig. 1 through the self feed mechanism, the parts being in the position they assume when receiving a charge of straw or hay.
Fig. 7 is a similar view to Fig. 6 with the self feed mechanism in the position it assumes when having delivered the charge into the baling chamber.

Hingedly connected at 56, at one side of the opening C' of the baling chamber C is the auxiliary guiding plate 57, which as before stated is provided with the longitudinal strips or arms 58 which bear upon the rollers 49 when in the position the parts assume as shown in Fig. 6, said rollers 49 sliding upon the strips 58 to elevate the same in the position as shown in Fig. 7, when the feeding plates 51 and 57 are in the chamber filling position. In order to hold said auxiliary plate 57 upwardly in the position as shown in Fig. 7, the rollers 49 having been moved so low on the strips 58 as not to assist in the elevation of the plate 57, the downwardly projecting triangular plates 59 carried by the arms 48 and having the cross bar 60 are provided, and said rod or bar 60 rests upon the respective arms 58, as shown in Fig. 7, and thereby the plate 57 is held at the proper position or in such a position as to prevent the admission of any hay or straw from beyond the gears 46 and at the same time assist in guiding the hay or straw downwardly to the open end of the chamber C.

The hopper H in which the self feed mechanism is operated is composed of the curved top plate 61 which is provided with the spring retaining rods 62 which hold the sides 63 in spring cushioned relation with the top 61, so that any crowding of the hay within the hopper due to the movement of the arms 48 and the feeding plate 51, will have a tendency to separate the sides 63, pushing the same outwardly, and thus prevent any detrimental effect that the crowding of the hay or straw within the hopper might have should the casing be made with rigid walls and top. The lug 64 carried by the top 61 and the two large springs 65 normally tend to hold the top 61 downwardly but permit the crowding of the hay within the hopper to slightly raise the said top 61 simultaneously with the pushing outwardly of the plates 63 yet independently thereof, thus providing as before stated for any crowding effect of the hay or straw within the hopper. The side walls 63 at their open or mouth ends are provided with the outwardly flaring aprons 66 which permit the easy throwing of the hay or straw within the mouth of the hopper by hand or otherwise, while the lip 68 which is hingedly connected to the forward ends of the curved top 61, as at 67, is provided with the upwardly inclined lip 69 which acts as a guiding means for the free end or spring projected plate 55 of the self feeding plate 51 during the movement of the same from the position as shown in Fig. 6 through the mouth of the hopper into the position as shown in Fig. 7.

Figures 8, 17:
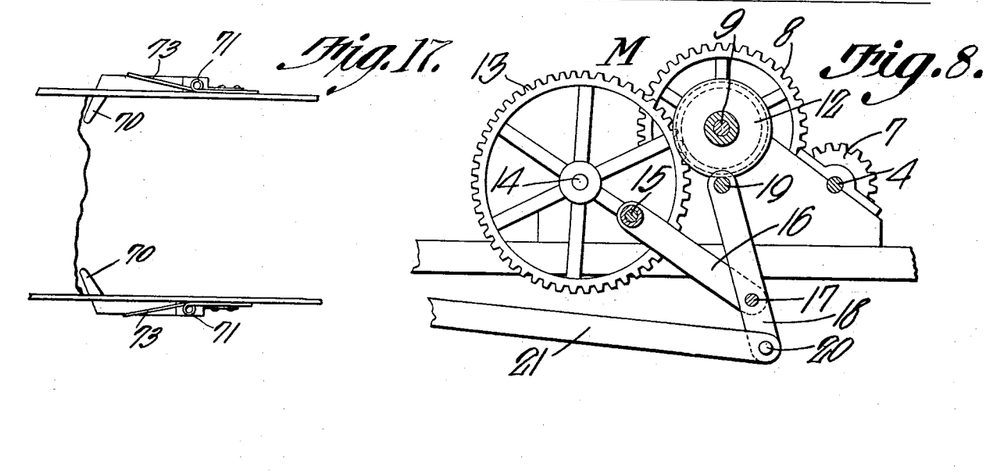
Fig. 8 is a similar view to Fig. 5 with the operating mechanism in the opposite position or in the extreme retracted position of the plunger.
Fig. 17 is a detail view illustrating the hooks for holding a compressed bundle against retrograde movement when released by the plunger.

*Bundle retainer.*—In order to retain the bundles in compressed condition within the baling chamber and beyond the opening C', as illustrated in Figs. 6, 7 and 17, the retaining hooks 70 are mounted as at 71 so as to be disposed transversely of the baling chamber at the plunger side of the respective compressed bundle, the same being movable into and out of the apertures or slots 72 of the chamber to be retracted through the medium of the plunger during the compression stroke thereof, said hooks upon the retraction stroke of the plunger due to the spring 73 being projected across the baling chamber at the initial movement or retraction of the plunger after compression so as to retain the compressed bundle during the movement of the self feed mechanism from the position shown in Fig. 6 through its movement as shown in Fig. 7, and until the plunger P has moved to compressed position, the same being removed from the baling chamber before sufficient compression strength is placed upon the plunger to render the withdrawal thereof difficult.

Figure 2:
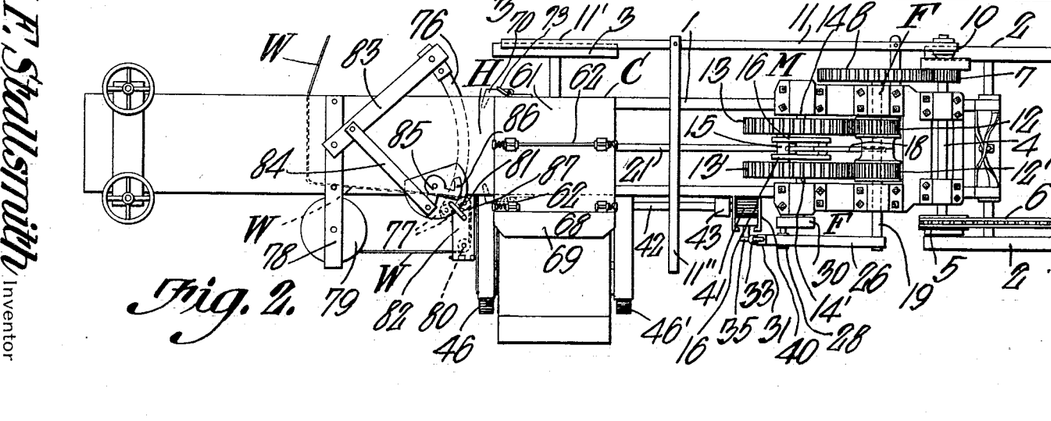
Fig. 2 is top plan view of the complete baling press.
Figure 3:
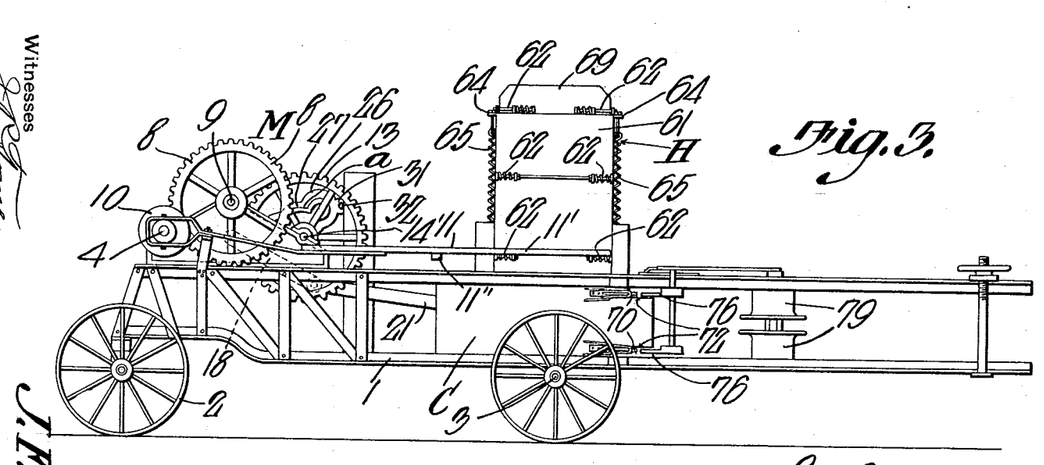
Fig. 3 is a similar view to Fig. 1 taken from the opposite, or left hand, side of the press.
Figure 11:
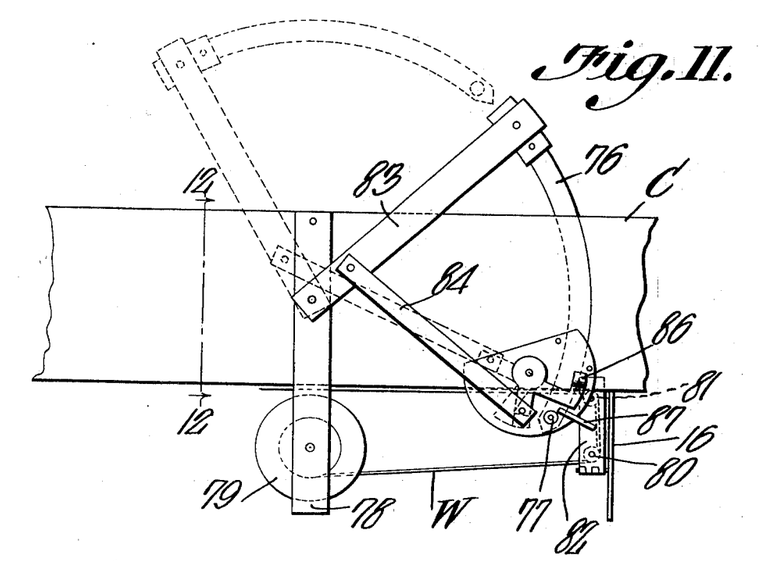
Fig. 11 is a top plan view of the portion of the baling chamber showing the relative position of the bale tying mechanism, full lines indicating the position of the needles when drawing the wire across the chamber, while dotted lines indicate the position thereof when out of the chamber.
Figure 12:
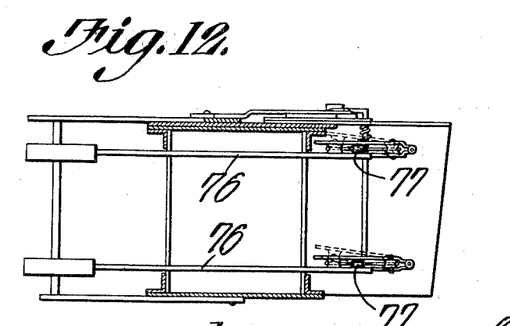
Fig. 12 is a section taken on line 12—12 of Fig. 11.
Figure 13:
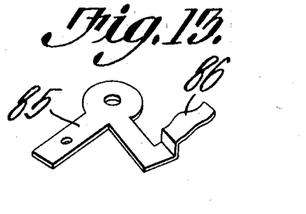
Fig. 13 is a detail perspective view of the locking device for the bale tying needles.

*Bale tying mechanism.*—In order that the formed bale within the baling chamber and beyond the respective retainers or hooks 70 and the mouth C', of the baling chamber, may be properly tied and not interfere with the successive operations of the plunger, the two needles 76 provided with the threading shives or pulleys 77 are mounted for movement into and across the baling chamber through the respective slots 25 formed in the plunger P, this movement being made during the primary halt of the plunger at the end of the compression stroke, as indicated in Fig. 5 and heretofore explained, so that the wire W may be fed across the bale from the spools 79, which are journaled in the arms 78 alongside of the baling chamber and thus provide two strands of wire about the bale within the chamber so that by the time the retaining hooks are brought into play to prevent any retrograde movement of the compressed bundle and the plunger has started to retract or move forwardly, the said needles 76 will have been withdrawn and the ends of the wire W may be tied manually, exteriorly of the baling chamber so that the bale may be removed in such tied condition. The wire W is fed through the pulleys 80 and 81 mounted in the respective plates 82 adjacent the rear end of the baling chamber and upon the side of the opening of the hopper H the said needles 76 being connected to and carried by the two arms 83 so that the same may be operated manually into positions as shown in Fig. 11, full lines indicating the forward movement when the wire is threaded through the slots 25 of the plunger, while dotted lines illustrate the position when the wire has been pulled through and around the forward end of the bale and the wire has been tied. An arm 84 is connected to the upper arm 83 carrying the needles and is pivotally connected to the bell crank lever 85 whose projection or lug 86 is disposed in the path to engage the arm 87 and assist in the proper feeding of the wire, so as to assume the dotted lines shown in Fig. 2 due to the movement of the bale within the baling chamber during the formation thereof, so that when the strand is threaded completely around the forward ends by the needle 76, the said wire will be completely about the bale and in ready access to be secured.

From the foregoing description, taken in connection with the drawings, it is evident that the power mechanism M is controlled through the clutch 10 and the levers 11' and 11'' from either side of the baling chamber of the machine, may be operably thrown into and out of engagement with the shaft 4 and consequently the power unit, which is preferably an explosive motor. When the mechanism is set in operation the self feed arm being in the position as shown in Fig. 6, the hay or straw is introduced into the open end of the hopper H, the plunger P being in the compression stroke position so as to close the opening P', of the baling chamber with the upper face thereof and to simultaneously compress the bundle previously fed through the opening C. The construction of the plunger operating mechanism as clearly shown in Figs. 5 and 14, will move the said plunger possibly at first toward compression stroke, the speed being reduced during the compression stroke and until the same has reached its maximum compression position, at which time during the movement of the lever or arm 16 from the position as shown in Fig. 5 to the position, as shown in Fig. 8, the said plunger P will be practically stationary. This feature, as before stated is important when the last or final bundle for the bale has been completed so that the bale tying mechanism heretofore described may be operated to feed the wire about the bale through the grooves 25 of the plunger P, the said wires being tied during the stationary position of the plunger P and without retarding and in any way effecting the operation of the baling press.

Figure 1:
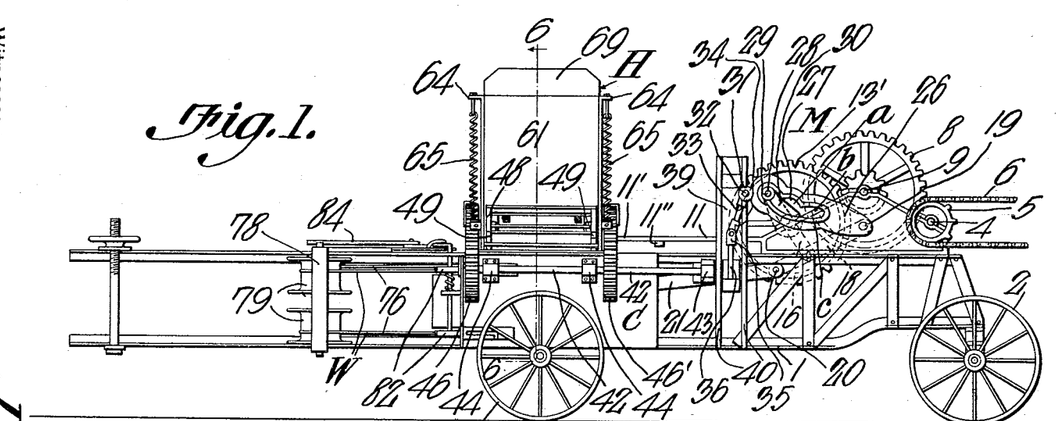
—Figure 1 is a side elevation of the complete baling press, the same being taken from the power side, or right hand side, of the machine.

The movement of the plunger P toward the forward end of the press is very rapid and is not halted at any stage thereafter but simultaneously with the movement of the said plunger toward the forward end of the press the lever 26, is moved downwardly so as to operate the rack 39, rotating the shaft 43 and the large gears 46 and 46', which lift the self feeding mechanism from the position as shown in Fig. 6 to that shown in Fig. 7, feeding the hay or straw within the hopper H into and through the opening C' of the baling chamber and between the end of the plunger and the retaining hooks 70, so that the two plates 51 and 57 will close the outer open end of the hopper during such movement and will press the hay or straw down into the baling chamber, the plate 51 remaining in such position while the roller 28 is traveling from the point c to d in the slot 27 of the lever 26. While the roller 28 travels from d to a, the plate 51 will be moved back out from the position as shown in Fig. 7 to again to assume the position as shown in Fig. 6. By this means, a continuous packing feed may be formed in the baling chamber C upon the retraction and movement toward compression of the plunger P, the said self feed mechanism being in the position to receive the hay or straw during the compression of the plunger P or upon the movement of the lever 26 upwardly as indicated in Fig. 1. By this construction or mechanism for operating the plate or feeder 51, the said plate describes substantially a semi-circle with the shaft 42 as its center, when moving from the position as in Fig. 6 to that shown in Fig. 7.

What is claimed is:

1. A baling press, having a baling chamber, a power mechanism at the forward end, a plunger operably connected to the power mechanism, a hopper for the baling chamber open at one side of the press, the walls and top of said hopper being spring cushioned to yield outwardly, a self feed mechanism movable into and out of the hopper from a horizontal plane, and means for operably connecting said self feed mechanism to the power mechanism.

2. A baling press, having a baling chamber, a power mechanism, a plunger operably connected to the power mechanism, a hopper for the baling chamber open at one side of the press, the walls and top of said hopper being spring cushioned to yield outwardly, two arms pivotally connected to one side of the baling chamber and disposed to describe substantially a semi-circle in its movement from receiving to baling chamber feeding position, a feeding plate carried by the outer end of said arms, and means for operably connecting said arms to the power mechanism.

3. A baling press, having a baling chamber, a power mechanism, a plunger operably connected to the power mechanism, a hopper for the baling chamber open at one side of the press, the walls and top of said hopper being spring cushioned to yield outwardly, two arms pivotally connected to one side of the baling chamber and disposed to describe substantially a semi-circle in its movement from receiving to baling chamber feeding position, a feeding plate carried by the outer ends of said arms, an auxiliary plate mounted at the same side of the baling chamber as the arms, and disposed for coöperation therewith to seal the hopper during the feeding operation, and means for operating said arms operably connected to the arms and the power mechanism.

4. A baling press, having a baling chamber, a power mechanism, a plunger operably connected to the power mechanism, a hopper for the baling chamber open at one side of the press, the walls and top of said hopper being spring cushioned to yield outwardly, two arms pivotally connected to one side of the baling chamber and disposed to describe substantially a semi-circle in its movement from receiving to baling chamber feeding position, a feeding plate carried by the outer ends of said arms, an auxiliary plate mounted at the same side of the baling chamber as the arms and disposed for coöperation therewith to seal the hopper during the feeding operation, two links one to each arm, two gear wheels at one side of the baling chamber and operably connected to the other ends of the respective links, and means for operating said gears in unison to cause said arms to describe a semi-circle from receiving to feeding position.

5. A baling press, having a baling chamber, a power mechanism, a plunger operably connected to the power mechanism, a hopper for the baling chamber open at one side of the press, the walls and top of said hopper being spring cushioned to yield outwardly, two arms pivotally connected to one side of the baling chamber and disposed to describe substantially a semi-circle in its movement from receiving to baling chamber feeding position, a feeding plate carried by the outer ends of said arms, an auxiliary plate mounted at the same side of the baling chamber as the arms, and disposed for coöperation therewith to seal the hopper during the feeding operation, two links one to each arm, two gear wheels journaled to one side of the baling chamber and operably connected to the other ends of the respective links, a shaft journaled upon the outside of the baling chamber and extended toward the power mechanism, gears mounted upon said shaft and in mesh with said first mentioned gears, and means for operating said last shaft to impart to the feeding arms a movement into and out of the hopper.

6. A baling press, having a baling chamber, a power mechanism, a plunger operably connected to the power mechanism, a hopper for the baling chamber open at one side of the press, the walls and top of the hopper being spring cushioned to yield outwardly, two arms pivotally connected to one side of the baling chamber and disposed to describe substantially a semi-circle in its movement from receiving to baling chamber feeding position, a feeding plate carried by the outer ends of said arms, an auxiliary plate mounted at the same side of the baling chamber as the arms, and disposed for coöperation therewith to seal the hopper during the feeding operation, two links one to each arm, two gear wheels journaled at one side of the baling chamber and operably connected to the other ends of the respective links, a shaft journaled upon the outside of the baling chamber and extended toward the power mechanism, gears mounted upon said shaft and in mesh with the first mentioned gears, a small pinion mounted upon the forward end of said shaft, a vertically reciprocatory rack operably engaging said pinion, and means for reciprocating said rack operably connected to the power mechanism.

7. A baling press, having a baling chamber, a power mechanism, a plunger operably connected to the power mechanism, a hopper for the baling chamber open at one side of the press, the walls and top of said hopper being spring cushioned to yield outwardly, two arms pivotally connected to one side of the baling chamber and disposed to describe substantially a semi-circle in its movement from receiving to baling chamber feeding position, a feeding plate carried by the outer ends of said arms, an auxiliary plate mounted at the same side of the baling chamber as the arms, and disposed for coöperation therewith to seal the hopper during the feeding operation, two links one to each arm, two gear wheels journaled to one side of the baling chamber and operably connected to the other ends of the respective links, a shaft journaled upon the outside of the baling chamber and extended toward the power mechanism, gears mounted upon said shaft and in mesh with the first mentioned gears, a small pinion mounted upon the forward end of said shaft, a vertically reciprocatory rack operably engaging said pinion, a lever provided with a cam slot pivoted to the forward end of the press and having its free end operably connected to said rack for reciprocating the rack, and a crank arm operably connected to the power mechanism and movable in the slot of the lever for actuating said lever.

8. A baling press, having a baling chamber with an upwardly open receiving aperture, a feeding hopper having a curved top hingedly connected to one side of the baling chamber and above the inlet opening thereof, springs for normally holding the top downwardly but permitting a yielding tension thereto due to the crowding of material within the hopper, two side walls for said hopper forming with the top a directing means for the material to the baling chamber, springs for connecting the said side walls to permit an outward yielding movement to be imparted thereto due to the crowding of the material in the hopper, a self feed mechanism disposed to move into and out of said hopper and form a closure therefor, and means for operating said self feed mechanism.

9. A baling press, having a baling chamber with an inlet aperture at the top thereof, a hopper for directing the material to be baled through said aperture, said hopper having yieldingly mounted top and side walls to accommodate any overcrowding of the material within the said hopper, a self feed mechanism movable into and out of said hopper and disposed to act as a closure for the hopper and baling chamber, and means for operating said self feed mechanism.

10. A baling press, having a baling chamber provided with an inlet aperture in the top thereof, a material guiding hopper connected to the baling chamber and open at one side thereof, the walls of said hopper being spring tensioned for an outward yielding movement due to the overcrowding of the hopper, a closure for the hopper pivotally connected to the baling chamber and movable into and out of closure position, a self feed mechanism disposed when said closure is in hopper opening position to form a continuation of said closure, said self feed mechanism being disposed for movement into and out of the hopper to baling chamber aperture closing position, coacting means carried by said self feed mechanism and the closure for actuating the closure simultaneously with the movement of the self feed mechanism, and mechanism for operating the self feed mechanism.

11. A baling press, having a baling chamber with an upwardly opening intake, a hopper having expansible walls disposed to guide the material to the intake of the baling chamber and to receive the material at one side of the baling chamber, two large gears journaled to one side of the baling chamber and adjacent the hopper, means for imparting an oscillatory movement to said gears, two arms having their inner terminals pivotally connected near the periphery of the respective gears, a plate disposed transversely of the ends of the arms to form a material engaging means to feed the material to the intake of the baling chamber, a closure for the hopper pivotally connected adjacent to the baling chamber and having its free end disposed to rest upon said arms and coact therewith and the plate of the arm to move said arms from material receiving position to feeding position and to simultaneously bring the closure into hopper closing position.

12. A baling press, having a baling chamber with an upwardly opening intake aperture, a material guiding hopper having a curved top and two segmental side walls disposed above and to each side respectively of the intake of the baling chamber, springs connected to the respective top and side walls to permit an outward movement thereof due to the overcrowding of material within the hopper, and a self feed mechanism movable into and out of the hopper.

13. A baling press, having a baling chamber with an upwardly opening intake aperture, a material guiding hopper having a curved top and two segmental side walls disposed above and to each side of the intake of the baling chamber, springs connected to the respective top and side walls to permit an outward movement thereof due to the overcrowding of material within the hopper, a self feed mechanism movable into and out of the hopper, and flexible guiding means upon the top and side walls of the hopper and upon the free end of the feeding means to absorb any shock due to the initial crowding of the material at the stroke of the feeding mechanism entering the hopper.

In testimony that I claim the foregoing as my own, I have hereto affixed my signature in the presence of two witnesses.

JOSEPH F. STALLSMITH.

Witnesses:
JOHN C. POWLESSON,
Mrs. E. D. KREIDER.

Copies of this patent may be obtained for five cents each, by addressing the "Commissioner of Patents, Washington, D. C."